Patented Sept. 18, 1934

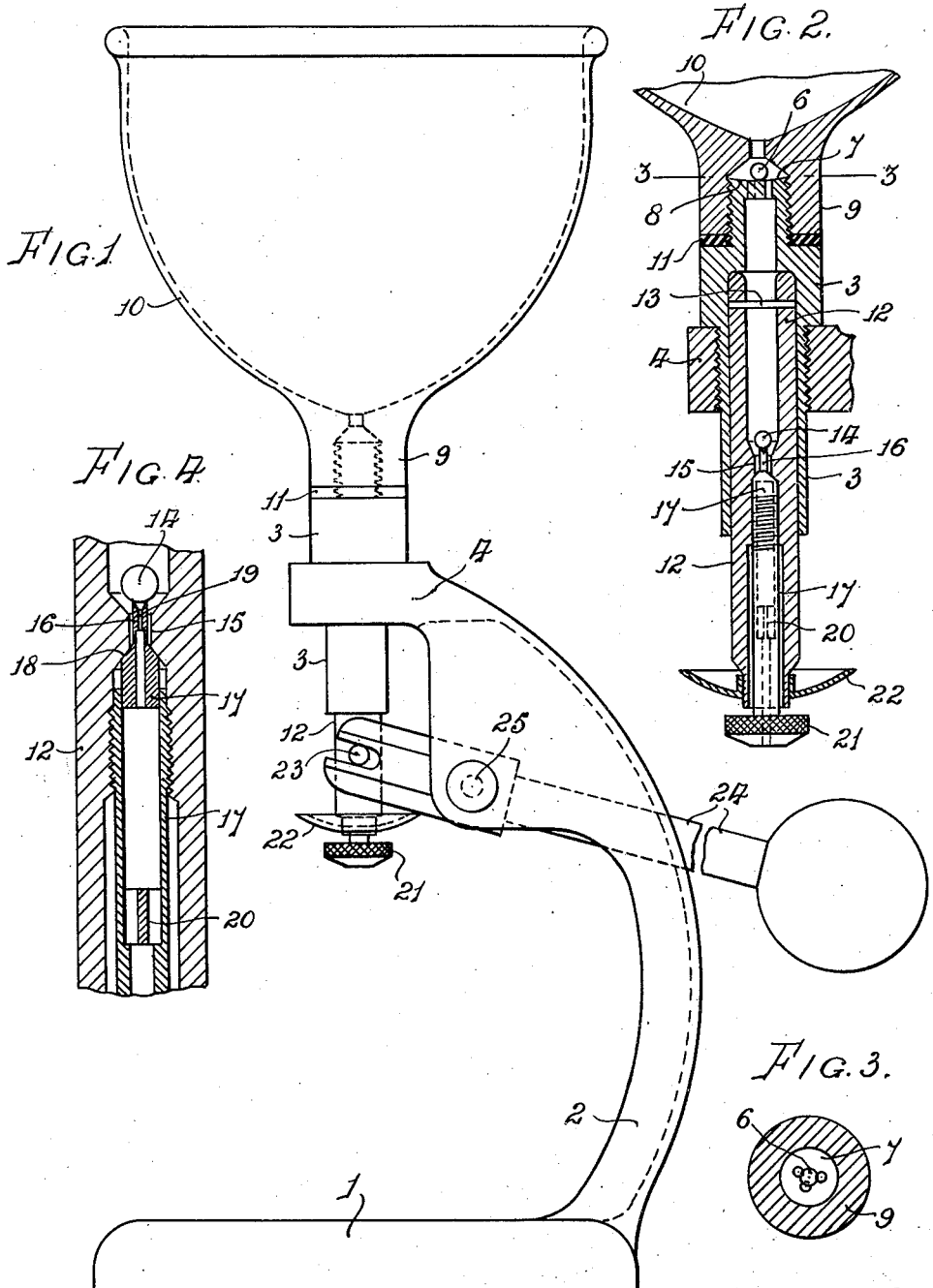

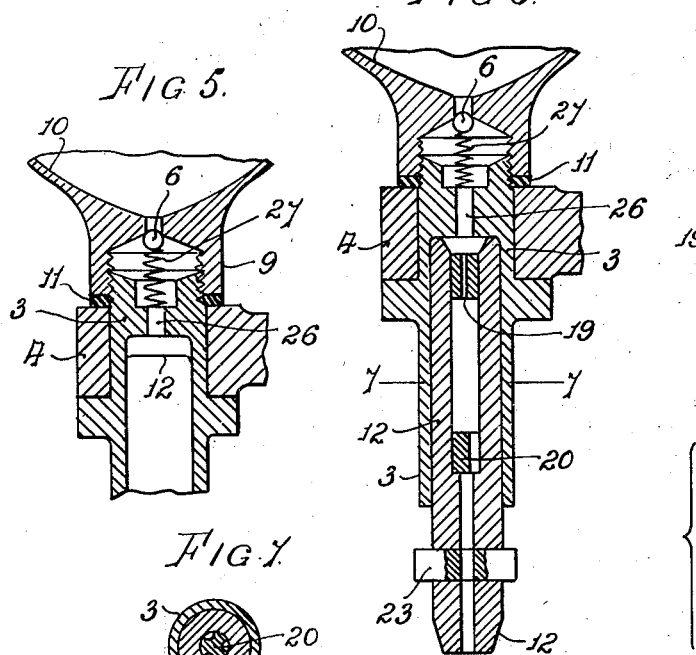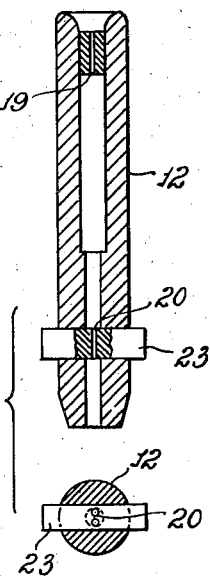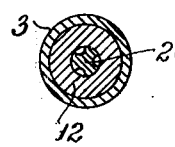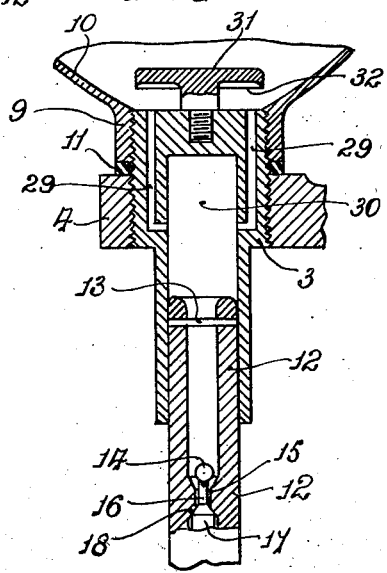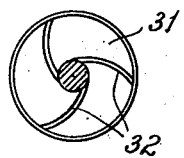

1,973,709

UNITED STATES PATENT OFFICE 1,973,709

APPARATUS FOR TREATING LIQUIDS OR SEMILIQUIDS

Harold Hibbert and Bertha Hibbert, Newton, Hyde, England

Application March 17, 1932, Serial No. 599,462
In Great Britain March 17, 1931

8 Claims. (Cl. 99—2)

This invention has reference to apparatus for treating liquids or semiliquids and has for its object to provide convenient and simple apparatus whereby cream and cream like substances can be treated and produced.

Apparatus according to this invention comprises a receptacle or container adapted to feed the substance to be treated into a compression chamber provided with a compression member, the substances passing into the compression chamber being compressed and expelled through an outlet having a small diameter into a passage having a greater diameter and containing a baffle from which the finished product passes into a receptacle, the device being preferably so constructed that the substance under treatment passes in a straight line through the apparatus thereby greatly facilitating the cleaning of the apparatus after use.

The invention is more particularly set forth with reference to the accompanying drawings wherein—

Fig. 1 is a side elevation of an apparatus according to the invention.

Fig. 2 is an enlarged sectional elevation of the ram of the apparatus shown in Fig. 1.

Fig. 3 is a section on the line 3—3 of Fig. 2.

Fig. 4 is an enlarged sectional view showing the internal arrangement of the ram.

Fig. 5 is a part sectional elevation showing an alternative construction of the ram.

Fig. 6 is a view similar to Fig. 2 showing an alternative construction of the ram.

Fig. 7 is a cross section on the line 7—7 of Fig. 6.

Fig. 8 is a sectional elevation and sectional plan of another form of ram.

Fig. 9 is a sectional elevation of an alternative arrangement at the base of the container and Fig. 10 is an underview of the top part thereof.

As shown in the drawings and referring first to Figs. 1, 2, 3 and 4 the apparatus comprises a base or stand 1 having an upwardly projecting arm 2 bent over toward the centre of the stand. In this arm 2 a cylindrical member 3 is mounted preferably by screwing into a boss 4 at the end of the arm and this cylindrical member 3 has a passage into it from the top which is closed and opened by a one way valve in the form of a ball 6 resting on a perforated plate or disc 7—see Fig. 3—acting against the underside of a conical bearing 8 in the shank 9 of a bowl or container 10 which is screwed on to the cylindrical member 3 against a washer 11 to keep the joint liquid tight.

Below the plate or disc 7 the cylindrical member 3 is widened out and in this wider part a ram 12 is mounted to reciprocate.

This ram 12 which constitutes a compression member is in the form of a hollow cylinder having a cross rod 13 which prevents the escape of a ball 14, the lower end of the base of the cylinder being constricted to a small passage 15 through which a jet nozzle 16 is passed, the jet 17 being secured by screwing into the lower part of the ram so that the head 18 of the jet effectively seals the lower end of the small passage 15.

The jet nozzle 16 is given a V-shape at the top and from the point of the V a very fine passage 19 is made downward into the jet 17. The V shape is given to the jet nozzle to prevent the fine passage 19 from being closed by the ball 14, and the purpose of the ball 14 is to close the passage 15, if, when the apparatus is in use, it should be found necessary to remove the jet from the ram.

Below the jet nozzle the jet itself is widened out and is provided with a baffle 20 which is closed at the centre, as shown in Fig. 7 so that liquid passing down the jet will encounter the closed portion and cannot run through the jet without passing through the openings of the baffle. The jet has a milled head 21 by which it can be screwed into, and out of the ram, the ram has a drip plate 22 and projecting arms 23 engaged by the bifurcations of a lever 24 detachably pivoted at 25 in the arm 2 by which the ram is reciprocated.

When it is desired to use the apparatus for making cream, a known weight of salt free butter is melted, being heated to approximately boiling point with the same weight of milk added to it, and the mixture is placed in the bowl or container 10. The lever 23 is now moved up and down to reciprocate the ram 12.

The liquid mixture flows past the ball 6, through the opening in the plate or disc 7 and fills the inside of the hollow ram 12. When the hollow ram is forced upward the ball 6 closes the opening from the bowl or container 10 and the only outlet for the liquid thus trapped is by way of the fine passage 19 through which the liquid is forced in an exceedingly fine jet into the wider part of the ram where it impinges on the baffle 20 and thus becomes completely emulsified and mixed and then passes downward through the openings in said baffle in the form of cream, which flows out into a suitable receiver placed on the base 1 of the apparatus.

In Fig. 5 a slightly modified arrangement of the ball valve 6 is shown and in this construction instead of a plate or disc there is an opening 26 above which is a spring 27 carrying the ball 6 and this spring normally holds the ball up against the underside of the opening at the bottom of the bowl or container 10 so as to prevent leakage of the contents if the ram 12, is removed when liquid is in the bowl or container; when the apparatus is in operation the pressure of the spring is overcome on the suction stroke of the ram when the liquid is drawn down past the ball valve.

Fig. 6 shows a further modification in which the fine passage 19 is formed by inserting a plug in the bore of the hollow ram 12 the form shown in Fig. 6 being easier to make than that shown in the preceding figures as it eliminates the need for the separate jet.

In Fig. 8 a further modification is shown, in which the baffle 20 is formed in the cross member 23 which is engaged at its ends by the bifurcated arms of the lever 24. In this arrangement, the cross member 23 is inserted and fixed in position, and is then bored to provide the necessary baffle holes.

A further modification of the top part of the apparatus is shown in Figs. 9 and 10 in which the ball valve below the bowl or container is dispensed with. The cylindrical member 3 is provided with a plurality of passages 29 which lead directly from the bowl or container 10 into a chamber 30 in which the hollow ram 12 is reciprocated. Above the cylindrical member 3 there is mounted a mushroom 31 conveniently provided with vanes 32 on its under side, which mushrooms overhangs the passages 29.

When the apparatus constructed according to this modification is in operation the liquid will flow down the passages 29 into the chamber 30 and as the plunger 12 is pushed up some of this liquid will be forced back up the passages into the bowl or container, and will be forced against the underside of the mushroom where it will be spread—the vanes 32 when used assisting such spreading—and will agitate the liquid in the bowl or container and thus nullify any tendency of the butter and milk to separate.

As soon as the top edge of the ram passes over the openings the liquid remaining will be trapped and will be forced out through the jet as already described.

The mushroom 31 which is described and illustrated only in connection with Figs. 9 and 10 may also be used with apparatus constructed according to the other arrangements shown and when working in co-operation with such arrangements suitable provision will be made for delaying the closing of the ball valves just below the bowl or container so as to ensure that the upward stroke of the ram will force air or liquid back into the bowl or container and agitate the contents without splashing.

When the apparatus has been used it is only necessary to pour hot water into the container at the top and to move the ram up and down until perfectly clean water is delivered from the lower end of the ram.

While the apparatus has been described with reference to the treatment of milk and butter to make cream it is not limited to this purpose as for instance it may be used for fine mixing, thickening or improving salad cream, dressings and the like.

Where it is desired to use the apparatus for making cream fillings or coatings for cakes or pastry the sugar required for this purpose can be mixed with the liquid or semi-liquid in the container before the cream is made and delivered.

What we claim as our invention and desire to secure by Letters Patent is:—

1. Apparatus for treating liquids and semi-liquids, comprising a stand, a container mounted on said stand and adapted to feed the substance to be treated, a member forming a compression chamber in communication with said container, a tubular compression member reciprocable in said compression chamber, the bore of said compression member being constricted at a point between its ends thereby dividing said bore into an upper portion in communication with said chamber and a lower portion in communication through a restricted passageway with said upper portion, a baffle disposed within the lower portion of said bore, means for reciprocating said compression member, and a one-way valve between the container and the compression chamber for closing the communication between them during the upstroke of said compression member whereby material in the chamber is forced through said restricted passageway into said lower portion of the compression member and against said baffle, the baffle being provided with openings for the delivery of said material.

2. In apparatus for treating liquids and semi-liquids, a stand, a container supported thereby, a cylindrical member in communication with said container, a one-way valve between said container and said cylindrical member for controlling said communication, a hollow ram slidably mounted in said cylindrical member and having a restricted passageway constituting the only outlet for material trapped between the hollow ram and the top of the cylindrical member, means for moving said ram upward thereby to force the trapped material through said restricted passageway, and a baffle disposed within the ram below said passageway, said baffle having openings for the delivery of said material.

3. In an apparatus for treating liquids or semi-liquids, a hollow ram having a valve seat therein, a ball disposed within said ram, a jet detachably mounted in said ram, said jet having a nozzle provided with a restricted passageway and extending above said valve seat, the free end of said nozzle being constructed so as to normally engage said ball and hold it away from said seat while maintaining said restricted passageway unobstructed, said ball being adapted when the jet is removed from the ram to engage said valve seat and close the passageway through said ram.

4. In apparatus for treating liquids and semi-liquids, a member forming a compression chamber, a hollow ram mounted for reciprocation in said chamber, the interior of the ram communicating through a constricted passageway with said compression chamber, a member extending transversely through said ram and obstructing the bore thereof, the obstructing portion of said member being perforated whereby said portion forms a baffle, said transverse member being of a length greater than the outside diameter of the ram whereby the ends of said member project beyond the sides of the ram, an arm pivoted to swing in a vertical plane, said arm having double bifurcations at one end thereof for embracing said hollow ram and engaging said transverse projections, and a handle at the opposite end of said arm for manually swinging the arm thereby to reciprocate said ram and cause material in the compression chamber to be forced through said constricted passageway into the ram.

5. In apparatus for treating liquids and semi-liquids, a stand, a liquid container supported on said stand, a hollow cylindrical member below said container and forming a compression chamber having openings in its wall forming passages communicating with said container, a hollow ram reciprocable in said chamber, means for reciprocating said ram, a mushroom projecting into said container from the end of said compression chamber and overlapping said passages, said ram being adapted when descending to draw liquid into said compression chamber and when rising to close the lower ends of said openings and to force some of said liquid back into the container against the underside of said mushroom, whereby the contents of said container is agitated, the liquid not forced back being trapped in said compression chamber above said openings in said wall, said trapped liquid being thus forced down said hollow ram, and means in said ram forming a constricted passageway for said trapped liquid thereby to emulsify the same.

6. In apparatus for treating liquids and semi-liquids, a stand, a liquid container supported on said stand, a hollow cylindrical member below said container and forming a compression chamber having openings in its wall forming passages communicating with said container, a hollow ram reciprocable in said chamber, means for reciprocating said ram, a mushroom projecting into said container from the end of said compression chamber and overlapping said passages, said ram being adapted when descending to draw liquid into said compression chamber and when rising to close the lower ends of said openings and to force some of said liquid back into the container against the underside of said mushroom, whereby the contents of said container is agitated, the liquid not forced back being trapped in said compression chamber above said openings in said wall, said trapped liquid being thus forced down said hollow ram, said mushroom having vanes on its underside for directing the forced back liquid and imparting a swirling motion thereto, and means in said ram forming a constricted passageway for said trapped liquid thereby to emulsify the same.

7. In apparatus for treating liquids and semi-liquids, a compression chamber, a hollow ram disposed in said chamber and having a restricted opening at its upper end communicating with a bore of relatively large diameter below said opening, a baffle disposed within said bore near its lower end and having a central imperforate portion below said restricted opening and on which liquid passing downward through said restricted opening impinges, said baffle having openings around said imperforate central portion through which said liquid passes after encountering said imperforate portion.

8. In apparatus for treating liquids and semi-liquids, a hollow cylinder forming a compression chamber, a tubular member communicating through a constricted passageway in one of its ends with said compression chamber, a baffle disposed within said tubular member and spaced from said restricted passageway, and means for forcing material in said compression chamber to pass through said restricted passageway and on to said baffle.

HAROLD HIBBERT.
BERTHA HIBBERT.